United States Patent
Yamagiwa et al.

[11] Patent Number: 5,961,907
[45] Date of Patent: Oct. 5, 1999

[54] PROCESS FOR PRODUCING SILICON NITRIDE SLIDING MEMBER

[75] Inventors: Masamichi Yamagiwa; Akira Yamakawa; Takao Nishioka; Takashi Matsuura, all of Itami, Japan

[73] Assignee: Sumitomo Electric Industries, Ltd., Japan

[21] Appl. No.: 08/920,452

[22] Filed: Aug. 29, 1997

Related U.S. Application Data

[63] Continuation of application No. 08/602,989, Feb. 16, 1996, abandoned.

[30] Foreign Application Priority Data

| | | | |
|---|---|---|---|
| Feb. 20, 1995 | [JP] | Japan | 7-30514 |
| Feb. 20, 1995 | [JP] | Japan | 7-30526 |
| Feb. 14, 1996 | [JP] | Japan | 8-26445 |

[51] Int. Cl.$^6$ .................................................. B29C 49/00
[52] U.S. Cl. .......................... 264/162; 264/320; 264/325
[58] Field of Search ................................ 264/162, 320, 264/325

[56] References Cited

U.S. PATENT DOCUMENTS

| | | | |
|---|---|---|---|
| 4,946,630 | 8/1990 | Ezis | 264/65 |
| 5,665,291 | 9/1997 | Honma et al. | 264/666 |
| 5,776,600 | 7/1998 | Katayama et al. | 428/325 |

*Primary Examiner*—Christopher A. Fiorilla
*Attorney, Agent, or Firm*—Bierman, Muserlian and Lucas

[57] ABSTRACT

A silicon nitride ceramic sliding member which includes $Si_3N_4$ grains as a main component and is shaped or controlled in dimensions through hot plastic working wherein the $Si_3N_4$ particles mainly includes β-type columnar crystal grains. The ceramic sliding member is produced by the step (I) of preparing a preform made of silicon nitride ceramic sintered body including $Si_3N_4$ grains as a main component wherein the average grain size (average grain size in minor axis in the case of β-type columnar crystal grains) of the $Si_3N_4$ grains is at most 0.5 μm, and the hot plastic working step (II) of placing the preform in a mold and effecting hot plastic deformation of the preform for shaping or dimensional control thereof while simultaneously increasing the average aspect ratio of the β-type columnar crystal grains. The resultant sliding member has excellent sliding properties, a high mechanical strength and a high reliability at a low cost without resort to grinding or the like for shaping thereof.

12 Claims, 3 Drawing Sheets

F I G. 1
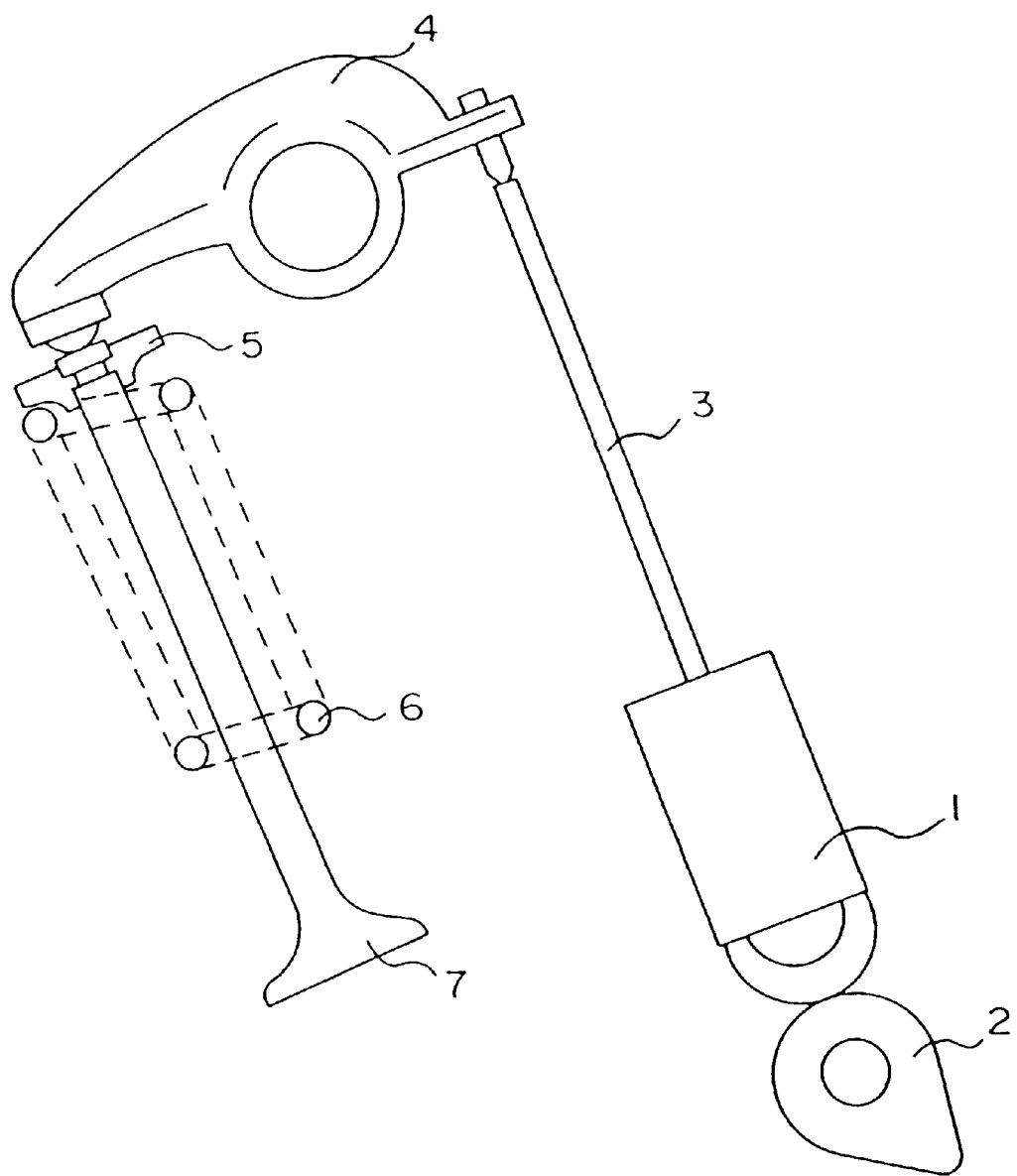

PROCESS FOR PRODUCING SILICON NITRIDE SLIDING MEMBER

PRIOR APPLICATION

This application is a continuation of U.S. patent application Ser. No. 08/602,989 filed Feb. 16, 1996, now abandoned.

BACKGROUND OF THE INVENTION

1. Field of the Invention

The present invention relates to a sliding member made of a silicon nitride ceramic and provided with a sliding surface, examples of which member include engine valve train parts such as a cam follower and a valve, a fuel injection pump part, and a bearing; and a process for producing the same.

2. Description of the Prior Art

Industrial equipment includes a large number of mutually sliding portions of machine parts. The generation of the loss of energy in the sliding portions and the wear thereof causes a decrease in energy efficiency and a decrease in the life span of the equipment. In view of this, improvement in the accuracy of sliding surfaces and development of novel sliding member materials have been under way in order to decrease the friction resistance in sliding portions and improve the durability of sliding members.

Ceramics have attracted attention as such novel sliding member materials. Silicon nitride ($Si_3N_4$) in particular is hoped for as a material of sliding members since it is excellent in strength and wear resistance. As for utilization of a silicon nitride ceramic in sliding members, there have been proposed utilization thereof in a cam follower as a car engine sliding part (see Japanese Patent Laid-Open No. 65,809/1993), and utilization thereof in an exhaust valve (see Japanese Patent Laid-Open No. 24,073/1989) in addition to utilization thereof in a ball bearing, a plain bearing, etc.

Although a silicon nitride sintered body once obtained through sintering is machined into a predetermined shape while using a diamond grind wheel or the like to produce a complicatedly shaped member such as a cam follower or an exhaust valve, the machining time is long with a large amount of machining due to the poor machinability of the silicon nitride sintered body. Accordingly, the fact is that the member thus obtained is very expensive to hinder the wide practical use thereof.

In view of the foregoing, various processes for producing a high-precision powder compact as attempts to improve the dimensional accuracy of a silicon nitride sintered body in order to decrease the amount of grinding of the silicon nitride sintered body have been under investigation. However, the dimensional accuracy and configurational accuracy of a sintered body obtained even according to a process for improving the dimensional accuracy of a powder compact cannot be said to be satisfactory.

Under such circumstances, attempts to produce a complicatedly shaped member through superplastic working of a silicon nitride ceramic have been made as proposed, for example, in Japanese Patent Publication No. 68,427/1993 and Japanese Patent Laid-Open No. 103,303/1992. According to such superplastic working, however, a composite material of silicon nitride and silicon carbide is the object of working, and $Si_3N_4$ grains before and after superplastic working must be granular crystals.

According to the above-mentioned superplastic working, $Si_3N_4$ must be admixed and composited with SiC to entail a difficulty in obtaining a dense sintered body, resulting in a failure in securing high mechanical strength and reliability thereof. In view of this, Japanese Patent Laid-Open No. 103,303/1992 discloses an attempt to grow $Si_3N_4$ grains into columnar crystals through a heat treatment of the former after superplastic working thereof to thereby improve the flexural strength of a sintered body. However, the heat treatment must be effected for a long period of time, and moreover involves a dimensional or configurational change of the sintered body to further require grinding or the like for correction thereof.

Another attempt to effect superplastic working of a silicon nitride sintered body comprising $Si_3N_4$ as the main component but not containing SiC has been made, which however requires either long-time superplastic working due to poor workability thereof or use of a sintered body having a very fine texture to entail many industrial problems.

U.S. Pat. No. 4,732,719 discloses an attempt to densify the texture of $Si_3N_4$ during superplastic working by admixing and compositing $Si_3N_4$ with Si. However, this entails problems such as a low strength of the resulting sintered body because Si remains in the sintered body.

SUMMARY OF THE INVENTION

In view of the foregoing conditions of the prior art, an object of the present invention is to inexpensively provide a complicatedly shaped silicon nitride ceramic sliding member endowed with excellent sliding properties, a high mechanical strength and a high reliability without resort to grinding or the like for shaping thereof.

In order to attain the foregoing object, the present invention provides a silicon nitride ceramic sliding member which comprises $Si_3N_4$ grains as a main component and is shaped or controlled in dimensions through hot plastic working wherein the $Si_3N_4$ grains mainly comprise β-type columnar crystal grains. In this specification and claims, the term "$Si_3N_4$ grains" means grains consisting of at least one crystal phase selected from the group consisting of crystal phases of α-type $Si_3N_4$, β-type $Si_3N_4$, α-type sialon and β-type sialon, unless otherwise specified.

A process for producing the foregoing silicon nitride ceramic sliding member comprises the step (I) of preparing a preform made of silicon nitride ceramic sintered body comprising $Si_3N_4$ grains as a main component wherein the average grain size (average grain size in minor axis in the case of β-type columnar crystal grains) of the $Si_3N_4$ grains is at most 0.5 µm, and the hot plastic working step (II) of placing the preform in a mold and effecting hot plastic deformation of said preform for shaping or dimensional control thereof while simultaneously increasing the average aspect ratio of β-type columnar crystal grains of the silicon nitride sintered body.

BRIEF DESCRIPTION OF THE DRAWINGS

FIG. 1 is a diagram showing a peripheral structure of a roller follower in Example 1;

DETAILED DESCRIPTION OF THE PREFERRED EMBODIMENTS

Figure 2:
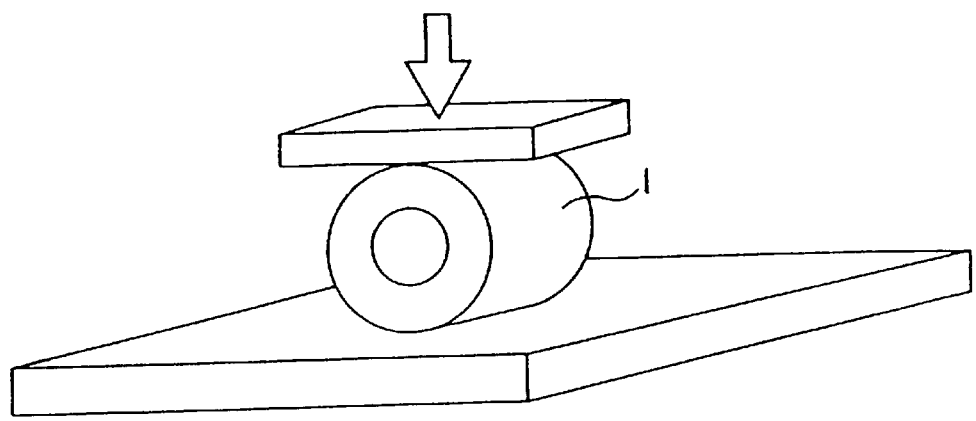
FIG. 2 is a schematic diagram showing an annular ring compression test in Example 3.

According to the present invention, a sintered body comprising $Si_3N_4$ grains as a main component but not substantially containing SiC nor Si is subjected to plastic working for predetermined shaping or dimensional control thereof while simultaneously growing $Si_3N_4$ grains into β-type columnar crystals or effecting phase transition of $Si_3N_4$ grains into β-type columnar crystals, whereby a complicatedly shaped silicon nitride ceramic sliding member sufficiently high in mechanical strength can be obtained.

The silicon nitride sintered body to be subjected to plastic working comprises $Si_3N_4$ grains as a main component, but is admixed and composited with neither other ceramic component nor Si. However, it may be admixed with a known sintering aid, a dispersion-strengthening agent and/or the like. Al oxide and nitride, Mg oxide, and oxides of rare-earth elements are especially preferably used either alone or in combination as the sintering aid. Addition of the sintering aid enables hot plastic working to be effected at a lower temperature for a shorter period of time. Further, $Si_3N_4$ not substantially containing SiC is so easy of sintering that a dense sintered body can be obtained even without using a hot press, a hot isostatic press or the like.

Although a densified sintered body having a relative density of 100% may be used as the material before plastic working, a sintered body having a relative density of 90 to 98%, particularly at least 90% and lower than 95%, is preferably used. When the relative density is lower than 90%, the workpiece itself is so insufficient in strength that it is broken in the course of plastic working or is liable to be insufficient in strength even after plastic working. On the other hand, as the relative density is not less than 95%, plastic working gradually becomes difficult and a relative density exceeding 98% further unfavorably reduces the working speed.

Meanwhile, $Si_3N_4$ grains in the silicon nitride sintered body to be subjected to plastic working may be either in α-type crystal form or in β-type crystal form, but must be fine crystals having an average grain size (average grain size in minor axis in the case of the β-type columnar crystal form) of at most 0.5 μm. Hereinafter, the grain size of β-type columnar $Si_3N_4$ grains is indicated in terms of the average grain size in their minor axis, unless otherwise specified. When the average grain size of $Si_3N_4$ grains exceeds 0.5 μm, plastic deformation occurs so hardly that application of an excessively high temperature and/or stress may be required for securing a predetermined shape or predetermined dimensions to entail decreases in the strength and wear resistance of the resulting sliding member, thus failing in obtaining an excellent sliding member.

In the plastic worked product, at least 70% of the $Si_3N_4$ grains must be in β-type columnar crystal form. A plastic worked product made of granular $Si_3N_4$ crystal grains is so low in mechanical strength that it is not preferred as a sliding member. According to the present invention, therefore, a sintered body made of fine β-type columnar crystal grains must be subjected to plastic working, or a sintered body made of fine granular α-type $Si_3N_4$ crystal grains must be subjected to plastic working while simultaneously effecting phase transition thereof into β-type columnar crystals. Alternatively, a sintered body may be controlled in α-type crystal content and β-type crystal content, and subjected to plastic working under chosen plastic working conditions, whereby the properties of the resulting plastic worked product can be controlled.

Accordingly, in the process of the present invention for producing a silicon nitride ceramic sliding member, $Si_3N_4$ grains can be grown into columnar crystals simultaneously with plastic working to increase the average aspect ratio of $Si_3N_4$ grains after plastic working as compared with that before plastic working.

Particularly with an increase of at least 10% in the average aspect ratio of $Si_3N_4$ grains after plastic working as against that before plastic working, sufficient development of columnar crystals can be secured to obtain a silicone nitride ceramic member remarkably improved in mechanical properties by plastic working. Making the average aspect ratio itself at least 3, preferably at least 5, in addition to the increase of at least 10% in the average aspect ratio can secure much superior mechanical properties such as flexural strength.

Further, according to the process of the present invention, an increase in the relative density of the sintered body as well as formation of columnar crystals through grain growth as described above can be attained by plastic working without resort to auxiliary means such as addition of Si. When formation of voids occurs through plastic working, the relative density of the sintered body is decreased by plastic working to lower the strength of the resulting plastic worked product. In view of this, sintering is allowed to proceed by utilizing a working stress during plastic working to increase the relative density of the sintered body. More specifically, a sintered body, the relative density of which is at least 90% and lower than 95% as mentioned above, can be increased in relative density to have a relative density of at least 95%, whereby a plastic working product excellent in mechanical properties can be obtained.

Hot plastic working is effected in a nonoxidizing atmosphere at a temperature of 800 to 1,800° C., preferably at most 1,600° C., further preferably at most 1,400° C. The nonoxidizing atmosphere is used in order to suppress formation of a degenerate surface layer when the temperature exceeds 1,200° C. even within the foregoing range of temperature. When the plastic working temperature exceeds 1,800° C., the mechanical strength of the resulting product is lowered due to coarsening of $Si_3N_4$ grains. Plastic working at a temperature of at most 1,400° C. can greatly lengthen the life span of a plastic working tool made of a high-melting-point metal. In order to reduce the cost of plastic working, plastic working in air is preferred. Such plastic working in air is possible when the temperature is at most 1,200° C.

The strain as bulk of a sintered body due to plastic working can be chosen depending on the requirements of the desired sliding part. In general, the sintered body is deformed by 0.1 to 20%, preferably 3 to 10%, as against the size of the sintered body before plastic working. When the degree of deformation is smaller than 0.1%, the required shape of a sliding member cannot be secured without any improvement in the density thereof. When the degree of deformation is large, the time necessary for deformation is lengthened to increase the cost of working. In addition, when the degree of deformation exceeds 10%, cavities are liable to be formed by plastic working. When the degree of deformation exceeds 20%, the mechanical strength of the workpiece is abruptly lowered because of cavities formed therein by plastic working.

Modes of shaping by such hot plastic working include crowning and corrective warping for securing the straightness of a shaft shape. Crowning is done in order to provide a sliding surface with a curved surface having a large curvature for avoiding localized sliding due to one-sided contact. A sintered body has heretofore been ground or abraded to effect crowning thereof for formation of a necessary three-dimensional curved surface. Thus, crowning has been known to be very costly working. Japanese Patent Laid-Open No. 225,728/1988 discloses a method of forming a crowning through brazing by making the most of a difference in thermal expansion between members to be joined with each other. In this case, however, the form of such a crowning is restricted by the shapes of parts before combination thereof, and hence cannot be controlled. According to the present invention, however, crowning can be effected, for example, by subjecting a cylindrical sliding member to hot plastic working while applying a load to the ends thereof.

On the other hand, in the case of a member in the form of a shaft, the necessary concentricity thereof has heretofore been secured by grinding because of warping or bending during sintering. This requires long-time grinding to cause an increase in cost. According to the present invention, the concentricity of a shaft can be corrected to or around a predetermined accuracy by hot plastic working with application of a load to part of the shaft. A concentricity of at most 0.1 mm/50 mm is attainable though it depends on the size of the shaft.

According to a specific method of hot plastic working, a plastic working tool is produced from a high-melting-point metal such as tungsten or molybdenum, a heat-resistant material such as carbon or boron nitride, or a ceramic material such as silicon carbide or boron carbide, and is used to effect plastic deformation of a silicon nitride sintered body into a necessary shape under predetermined stress and temperature conditions.

Additionally stated, the sintered body to be subjected to plastic working is preferably formed in such a way to have a shape close to the shape of a final member for avoiding the necessity of post cutting thereof. Since any mode of plastic working itself can be employed in so far as it involves predetermined stress and temperature, employable modes of plastic working include not only so-called forging and rolling, but also so-called superplastic working as long as it is a mode of plastic working as is usually employed for metallic materials.

When a workpiece obtained through plastic working is incapable of securing predetermined accuracy and shape only by plastic working, target sites thereof may be subjected to post removal working such as grinding. On the other hand, when the surface roughness of a sliding surface obtained through plastic working is so coarse as to lead to damage to a sliding counterpart, lapping may be effected to improve the surface accuracy of the sliding surface.

The workpiece obtained through plastic working or the workpiece further subjected to the above-mentioned removal working may further be subjected to a heat treatment to recover a strain or defect involved therein during plastic working. A further improvement in mechanical strength can be attained by the heat treatment. As for heating conditions, heating temperature and time substantially incapable of grain growth of $Si_3N_4$ are chosen. This is because involvement of grain growth of $Si_3N_4$ causes changes in size and shape to fail in maintaining the accuracy of the workpiece after plastic working. A heat treatment particularly at a temperature not less than the sintering temperature of the sintered body before plastic working is not preferable, because it may lowers the dimensional accuracy.

EXAMPLE 1

An $Si_3N_4$ sintered body mainly comprising columnar β-type $Si_3N_4$ crystal grains having an average grain size of 0.3 μm in minor axis and an average aspect ratio of 4, containing granular α-type $Si_3N_4$ crystal grains having an average grain size of 0.3 μm, and having a relative density of 100%, wherein the number of crystal grains existing for a length of 50 μm in a cross section of the sintered body (linear density) was 165, was worked into a cylindrical shape (height: 12 mm, outer diameter: 18 mm, inner diameter: 12 mm) close to the shape of a roller follower. Additionally stated, the α-type crystal : β-type crystal ratio of the sintered body was 20:80, while the four-point flexural strength of the sintered body was 800 MPa according to JIS.

The resulting cylindrical sintered body was subjected to plastic working at 1,400° C. in a nitrogen atmosphere under a stress of 50 MPa loaded thereon in the radial direction thereof while using an SiC plastic working tool. The plastic working tool had a cylindrical tool (outer diameter: 12 mm), which was inserted into the cylindrical sintered body along the inner periphery thereof, and two pieces of a cylindrical tool (outer diameter: 40 mm, inner diameter: 18 mm) bisected in the axial direction thereof and having a curved surface corresponding to a crowning in the inner peripheral surface thereof, which pieces were disposed along the outer periphery of the sintered body.

A crowning having a large curvature radius in the periphery of an end rim portion of the outer peripheral surface of the sintered body and a difference of 50 μm in level was formed through 5 minutes of plastic working. Additionally stated, in the plastic working product, the α-type crystal: β-type crystal ratio was 10:90, the linear density was 120/50 μm, the relative density was 99%, and the average aspect ratio of β-type columnar crystals was 6. The lot-to-lot variation of the amount of crowning was within 1 μm for 10 samples. A roller follower thus obtained was ground to have an inner diameter of 11.8±0.005 mm, while the crowning portion thereof was lapped to improve the surface roughness thereof in terms of $R_{max}$ from 3 μm to 0.2 μm. The resulting roller follower 1 was incorporated into a passenger car engine having a peripheral structure as schematically shown in FIG. 1, and then evaluated with respect to sliding performance, etc. through a 100,000 kilometer driving test to find out that it exhibited excellent performances including low attacking properties against a cam (carbon steel S50C) as the counterpart and a low sliding resistance as compared with a roller follower produced by only grinding the same sintered body as described above. In FIG. 1, reference numerals are as follows:

2: cam, 3: push rod, 4: rocker arm, 5: retainer, 6: valve spring and 7: valve.

EXAMPLE 2

89 wt. % of an α-type $Si_3N_4$ powder was admixed with 5 wt. % of an $Al_2O_3$ powder, 3 wt. % of a $Y_2O_3$ powder, 2 wt. % of an MgO powder and 1 wt. % of an AlN powder as sintering aids to prepare a mixed powder, which was then molded and then sintered in a nitrogen atmosphere at 1,500 to 1,700° C. for 30 to 120 minutes to obtain a sintered body having the same shape as in Example 1. The α-type crystal form/β-type crystal form ratio of each sintered body thus obtained and the average grain size of $Si_3N_4$ grains therein are shown in Table 1. Additionally stated, a sintered body of Sample 3 was made of an $Si_3N_4$-SiC composite material produced by adding 20 wt. % of an SiC powder to an $Si_3N_4$ powder at the time of production thereof, and having a final $Si_3N_4$ content of 59 wt. %.

Subsequently, each sintered body was subjected to plastic working under conditions as shown in Table 1 while using the same plastic working tool as in Example 1. The amount of a crowning formed by plastic working was 50 μm on average for 10 samples, and the lot-to-lot variation of the amount of crowning was within 2 μm for 10 samples in all cases of conditions. The amount of β-type crystal grains of $Si_3N_4$ grains in each sintered body after plastic working was measured, and is also shown in Table 1.

Each of the resulting roller followers was tested in the same manner as in Example 1 for evaluation of the sliding performance thereof to find the wear loss of a cam as the counterpart and the wear loss of a roller, which are shown in Table 1. Additionally stated, each of roller followers as examples of the present invention could be produced at a cost of ½ of that of the corresponding roller follower produced from the same sintered body only by grinding.

plastic working product was mainly made of α-type $Si_3N_4$ to be low in strength and poor in sliding performance. In other words, it is believed that the member itself was so liable to wear because of the low strength thereof that the wear of a cam as the counterpart was accelerated. Addition-

TABLE 1

| | Properties of Sintered Body | | Plastic Working Conditions | | | | Sliding Performance (Wear loss) | |
|---|---|---|---|---|---|---|---|---|
| Sample | Crystal Form α/β | Average Grain Size (μm) | Temp. (° C.) | Time (min.) | Amount of Deformation (μm) | Amount of β-Crystals (%) | Cam (μm) | Roller (μm) |
| 1 | 10/90 | 0.4 | 1500 | 10 | 50 (0.6) | 100 | 10 | 15 |
| 2* | 0/100 | 0.6 | 1600 | 20 | 50 (0.6) | 100 | 50 | 40 |
| 3* | 0/100 | 0.4 | 1600 | 20 | 50 (0.6) | 100 | 60 | 25 |
| 4 | 30/70 | 0.3 | 1400 | 8 | 50 (0.6) | 90 | 10 | 10 |
| 5 | 60/40 | 0.2 | 1300 | 10 | 50 (0.6) | 70 | 10 | 10 |
| 6 | 10/90 | 0.2 | 1300 | 8 | 50 (0.6) | 90 | 10 | 10 |
| 7* | 10/90 | 0.4 | 1500 | 3 | 8 (0.09) | 100 | 40 | 40 |
| 8* | 70/30 | 0.4 | 1400 | 5 | 10 (0.1) | 30 | 40 | 50 |
| 9 | 90/10 | 0.2 | 1500 | 15 | 50 (0.6) | 70 | 10 | 10 |

(Note) Samples with in the Table are of comparative examples. Sample 3 was made of an $Si_3N_4$—SiC composite material. Data in ( ) at a column for Amount of Deformation each indicate the proportion of the amount of deformation to the original size before plastic working, i.e., the percentage of deformation.

As is understandable from the results in Table 1, the roller followers as the examples of the present invention all exhibited an excellent sliding performance. By contrast, in the case of Sample 2 as a comparative example, plastic working conditions were excessive to be unable to secure an excellent sliding performance because the average grain size of $Si_3N_4$ grains in a sintered body to be subjected to plastic working exceeded 0.5 μm and the plastic workability of the sintered body was therefore poor. In the case of Sample 7, the amount of deformation was too small to obtain a predetermined shape, and the sliding performance thereof was also poor. In other words, plastic working was required to be effected at a temperature substantially as high as the sintering temperature for a long period of time to entail growth of grains, with the result that no excellent sliding properties could be secured. In the case of Sample 8, the ally stated, Sample 3 is a comparative example wherein use was made of an $Si_3N_4$—SiC composite material.

EXAMPLE 3

The roller followers (workpieces after plastic working) of Samples 1 and 3 as shown in Table 1 in the foregoing Example 2 were subjected to a heat treatment and/or a grinding treatment as shown in Table 2. Additionally stated, the heat treatment was effected in a nitrogen atmosphere. The resulting samples were evaluated in the same manner as in Example 2 with respect to sliding performance, and the tensile strengths thereof were further measured. Additionally stated, the tensile strength was evaluated in terms of the maximum tensile stress developed in an annular ring compression test wherein a roller follower 1 as a sample was horizontally placed and vertically loaded with a compression load as schematically shown in FIG. 2. The results are shown in Table 2.

TABLE 2

| Sample | Table 1 | Heating Conditions | | Roller Follower Grinding Conditions | | Tensile Strength (MPa) | Sliding Performance (Wear loss) | |
|---|---|---|---|---|---|---|---|---|
| | | Temp. (° C.) | Time (min.) | Ground Site | Grinding Method | | Cam (μm) | Roller (μm) |
| 10 | 1 | 1600 | 30 | no ground | | 900 | 8 | 6 |
| 11* | 1 | 1800 | 60 | no ground | | 500 | 10 | 15 |
| 12* | 3 | 1500 | 60 | no ground | | 750 | 30 | 8 |
| 13 | 1 | 1300 | 60 | no ground | | 850 | 8 | 8 |
| 14 | 1 | 1100 | 60 | no ground | | 850 | 8 | 8 |
| 15 | 1 | 1300 | 66 | crowning | lapping | 1000 | 5 | 5 |
| 16 | 1 | not heat-treated | | crowning | lapping | 950 | 6 | 7 |

(Note)
Samples with * in the Table are of comparative examples.

When the results in Table 2 are compared with those in Table 1, it is understood that further improvements in strength and sliding performance can be attained by additional heat treatment and/or removal working such as grinding after plastic working according to the present invention. On the other hand, Sample 11 as a comparative example had grains grown because heated at a temperature higher than the sintering temperature thereof, with the result that the tensile strength thereof was lowered (the tensile strength of the plastic worked product of Sample 1 in Table 1 was 800 MPa) while no improvement in the sliding performance thereof was recognized. Additionally stated, Sample 12 is of a comparative example wherein use was made of an $Si_3N_4$—SiC composite material.

EXAMPLE 4

An α-type $Si_3N_4$ powder was admixed with 5 wt. % of an $Al_2O_3$ powder, 5 wt. % of a $Y_2O_3$ powder and 1 wt. % of an MgO powder to prepare a mixed powder, which was then injection-molded into a shape of an engine exhaust valve and then sintered in a nitrogen atmosphere at 1,600° C. The resulting $Si_3N_4$ sintered body had a relative density of 96%, and contained 60% of α-type $Si_3N_4$ crystal grains having an average grain size of 0.4 μm and the balance substantially of β-type $Si_3N_4$ crystal grains having an average grain size of 0.4 μm in minor axis and an average aspect ratio of 3.

Figure 3:
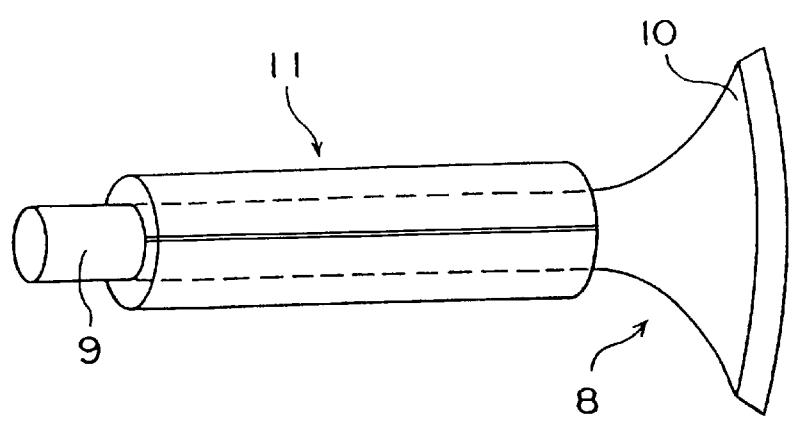
FIG. 3 is a perspective view illustrating plastic working of an exhaust valve in Example 4.

This $Si_3N_4$ sintered body was in the form of an exhaust valve 8 as shown in FIG. 3, comprising a shaft portion 9 having an outer diameter of 8.0 mm and an umbrella portion 10 having a maximum outer diameter of 30 mm, and having a total length of 80 mm as including the umbrella portion 10. The shaft portion 9 was warped by 1.2 mm as against the center of the shaft. Thus, this shaft portion 9 was put between the pieces of a bisected cylinder having an inner diameter of 8 mm and an outer diameter of 12 mm as a tungsten plastic working tool 11, loaded with a load of 60 kgf, and subjected to 10 minutes of plastic working at 1,500° C. The $Si_3N_4$ sintered body after plastic working had a relative density of 98% and comprised crystal grains containing 90% of β-type crystals having an average grain size of 0.5 μm in minor axis and an average aspect ratio of 4.

Figure 4:
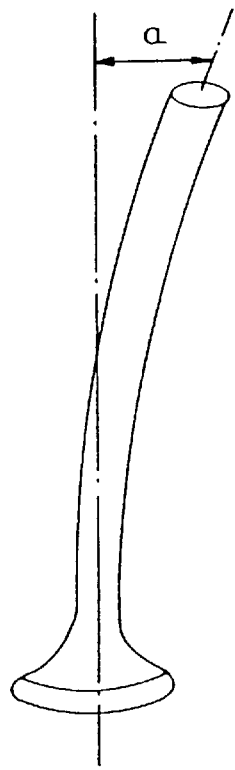
FIG. 4 is a diagram showing a method of measuring the warpage of a shaft portion in Example 4.

The warpage of the shaft portion of the resulting worked product (exhaust valve) was measured in terms of the length denoted by "a" as schematically shown in FIG. 4. It was found out that the warpage was decreased to at most 0.05 mm for all 50 valves obtained according to the foregoing procedure. In this case, the amount of deformation corresponded to about 14% in terms of the amount of deformation. An exhaust valve thus obtained was further ground on surfaces thereof to be brought into contact with a cotter portion and a valve sheet, and then tested on a real car. As a result, breakage of the valve, wear of parts combined therewith, etc. were not recognized. Thus, it was found out that the valve can be used without any problems.

EXAMPLE 5

The same $Si_3N_4$ sintered bodies as in the case of Sample 1 in Table 1 in the foregoing Example 2 were subjected to plastic working under varied conditions as shown in Table 3 to obtain plastic worked products with varied amounts of deformation. Additionally stated, the sintered bodies before plastic working were cylindrical sintered bodies having a height of 12 mm, an outer diameter of 18 mm and an inner diameter of 12 mm, which were vertically compressed without constraint of the outer peripheral surfaces thereof, and then subjected to plastic working to measure the outer diameters thereof after plastic working. Further, the relative densities of the plastic worked products were measured, while the tensile strengths thereof were measured in the same manner as in Example 3. The results are shown in Table 3.

TABLE 3

| | Plastic Working Conditions | | Amount of Deformation | | Properties of Product | |
|---|---|---|---|---|---|---|
| Sample | Temp. (° C.) | Time (min.) | (mm) | (%) | Density (%) | Strength (MPa) |
| 17* | not worked | not worked | none | none | 94 | 800 |
| 18* | 1550 | 3 | — | <0.1 | 94 | 800 |
| 19 | 1550 | 10 | 0.1 | 1.2 | 97 | 850 |
| 20 | 1550 | 60 | 0.5 | 6.0 | 98 | 900 |
| 21 | 1550 | 120 | 1.0 | 12.0 | 95 | 800 |
| 22* | 1550 | 240 | 2.0 | 24.0 | 92 | 300 |

(Note)
Samples with * in the Table are of comparative examples.

It is understood from these results that the relative density and tensile strength of a plastic worked product can be improved through appropriate plastic working as against those of Sample 17 not subjected to plastic working. In the case of Sample 21, however, a decrease in strength was recognized because the amount of deformation exceeded 10%. In the case of Sample 22, cavities were developed in the workpiece to abruptly lower the strength thereof because the amount of deformation exceeded 20%. On the other hand, in the case of Sample 18, the amount of deformation was lower than 0.1% not only to fail in securing predetermined dimensions but also to attain no recognizable improvements in density and strength.

EXAMPLE 6

The same $Si_3N_4$ sintered bodies as in the case of Sample 1 in Table 1 in the foregoing Example 2, which were sintered bodies having a height of 12 mm, an outer diameter of 18 mm and an inner diameter of 12 mm before plastic working, were vertically compressed and subjected to plastic working under varied conditions as shown in Table 4 without constraint of the outer peripheral surfaces thereof as in Example 5. Additionally stated, plastic working was effected in a nitrogen atmosphere while using a tungsten working tool except for the case of Sample 27 where plastic working was effected in air while using an SiC working tool. The number per tool of cylindrical plastic worked products wherein the evenness of the ends thereof could be maintained at a level of 0.05 mm in such plastic working is shown in Table 4.

TABLE 4

| | Plastic Working Conditions | | Amount of Deformation | Number of Worked | |
|---|---|---|---|---|---|
| Sample | Temp. (°C.) | Time (min.) | (mm) | Products | Remarks |
| 23 | 1500 | 10 | 0.05 | 100 | in nitrogen with W tool |
| 24 | 1350 | 20 | 0.05 | 1000 | in nitrogen with W tool |

TABLE 4-continued

| Sample | Plastic Working Conditions Temp. (°C.) | Time (min.) | Amount of Deformation (mm) | Number of Worked Products | Remarks |
|---|---|---|---|---|---|
| 25 | 1250 | 40 | 0.05 | 50000 | in nitrogen with W tool |
| 26 | 1150 | 60 | 0.03 | 50000 | in nitrogen with W tool |
| 27 | 1150 | 60 | 0.03 | 30000 | in air with SiC tool |

It is understood from these results that the life span of a plastic working tool, even when used for the same amount of deformation, is lengthened to secure the desired working accuracy for a long period of time as the plastic working temperature is lowered. It is also understood from the results of Sample 27 that plastic working even in air is possible at a plastic working temperature of at most 1,200° C.

EXAMPLE 7

89 wt. % of an α-type $Si_3N_4$ powder having an average grain size of 0.3 μm was admixed with 5 wt. % of an $Al_2O_3$ powder, 5 wt. % of a $Y_2O_3$ powder and 1 wt. % of an MgO powder as sintering aids to prepare a mixed powder, from which a cylindrical compact having an outer diameter of 18 mm and a height of 10 mm was produced.

This compact was sintered in a nitrogen atmosphere at a temperature of 1,400 to 1,700° C. for 30 to 120 minutes. Sintered bodies obtained according to the foregoing procedure were ground in the height-wise direction thereof to obtain $Si_3N_4$ sintered bodies having an outer diameter of about 15 mm and a height of about 7 mm. The relative densities, average aspect ratios of β-type columnar crystal grains, and flexural strengths of the sintered bodies as samples are shown in Table 5.

The sintered bodies thus obtained were each loaded with a compressive load in the height-wise direction thereof and subjected to plastic working. A compression test tool made of carbon coated with boron nitride was produced. Plastic working was effected in a nitrogen atmosphere under conditions as shown in Table 5 while using the compression test tool.

Plastic worked products obtained through such plastic working were examined with respect to amount of deformation in the height-wise direction thereof, relative density, average aspect ratio of β-type columnar crystal grains, rate (%) of increase in the average aspect ratio and flexural strength. The results are also shown in Table 5. Additionally stated, the flexural strength was measured with a span of 10 mm while using a test piece cut out from a sintered body for every case.

TABLE 5

| | Properties of Sintered Body | | | Plastic Working Conditions | | | Properties of Plastic Worked Product | | | | |
|---|---|---|---|---|---|---|---|---|---|---|---|
| Sample | Density (%) | Aspect Ratio | Flexural Strength (MPa) | Temp. (° C.) | Time (min.) | Stress (MPa) | Amount of Deformation (mm) | Density (%) | Aspect Ratio | Rate of Increase** | Flexural Strength (MPa) |
| 1* | 85 | 1.5 | 400 | 1500 | 5 | 200 | 0 | broken | midway | — | 0 |
| 2 | 91 | 2.0 | 800 | 1500 | 15 | 100 | 0.1 | 93 | 3.0 | 50 | 900 |
| 3 | 93 | 2.5 | 900 | 1500 | 15 | 100 | 0.3 | 96 | 3.0 | 20 | 1000 |
| 4 | 95 | 3.0 | 1000 | 1500 | 15 | 100 | 0.2 | 97 | 3.5 | 17 | 1100 |
| 5 | 97 | 4.0 | 1100 | 1500 | 15 | 100 | 0.1 | 98 | 4.5 | 13 | 1200 |
| 6* | 100 | 5.0 | 1500 | 1500 | 15 | 100 | 0.02 | 100 | 5.5 | 10 | 1300 |
| 7* | 93 | 2.5 | 900 | 700 | 15 | 100 | 0 | 93 | 2.5 | 0 | 900 |
| 8 | 93 | 2.5 | 900 | 800 | 15 | 100 | 0.05 | 94 | 3.0 | 20 | 1000 |
| 9 | 93 | 2.5 | 900 | 1400 | 15 | 100 | 0.15 | 96 | 3.5 | 40 | 1100 |
| 10 | 93 | 2.5 | 900 | 1700 | 15 | 100 | 0.3 | 99 | 5.0 | 100 | 1200 |
| 11* | 93 | 2.5 | 900 | 1900 | 15 | 100 | 0.3 | 97 | 5.0 | 100 | 700 |
| 12 | 93 | 2.5 | 900 | 1600 | 10 | 50 | 0.2 | 99 | 4.0 | 60 | 1300 |
| 13* | 93 | 2.5 | 900 | 800 | 1 | 150 | 0 | 93 | 2.5 | 0 | 900 |
| 14 | 93 | 2.5 | 900 | 1500 | 1 | 100 | 0.05 | 95 | 3.0 | 20 | 1000 |
| 15 | 93 | 2.5 | 1200 | 1500 | 30 | 100 | 0.35 | 98 | 5.0 | 100 | 1400 |
| 16* | 98 | 4.5 | 800 | 1900 | 15 | 100 | 0.1 | 97 | 5.0 | 11 | 900 |
| 17 | 92 | 2.0 | 800 | 1400 | 15 | 100 | 0.1 | 94 | 3.0 | 50 | 1000 |
| 18 | 92 | 2.0 | 800 | 1600 | 15 | 100 | 0.2 | 98 | 5.0 | 150 | 1300 |
| 19* | 92 | 2.0 | 800 | 750 | 15 | 100 | 0 | 92 | 2.0 | 0 | 800 |

(Note)
Samples with * in the Table are of comparative examples.
**: Rate (%) of increase in the average aspect ratio of β-type columnar crystal grains after plastic working as compared with that before plastic working.

As is understandable from Table 5, in the case of Sample 1, the sintered body was broken in the course of plastic working because the relative density thereof was too low. On the other hand, in the case of Sample 6, plastic deformation under conditions set therefor was little because the relative density of the sintered body was too high the other way around. In the case of Sample 7, plastic working was impossible because the plastic working temperature was too low. In the cases of Samples 11 and 16, the plastic worked products were deteriorated in strength because the plastic working temperature was too high. In the cases of Samples 13 and 19, no plastic deformation occurred because the plastic working conditions (temperature and time) were insufficient. By contrast, the plastic working products as examples of the present invention were all improved in strength because plastic working was effected in every case.

EXAMPLE 8

Figure 5:
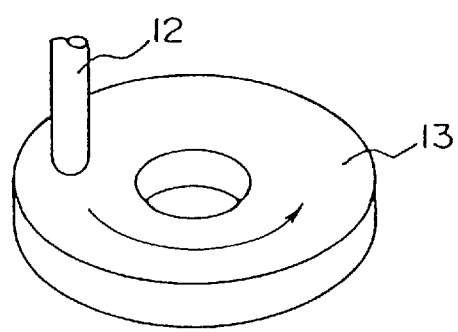
FIG. 5 is a schematic diagram showing a pin-on-disk test in Example 8.

Flexural test pieces of the same $Si_3N_4$ sintered body before plastic working and the same plastic worked product as in the case of Sample 5 as shown in Table 5 in the foregoing Example 7 were used for comparison therebetween in respect of wear resistance according to a pin-on-disk method as schematically shown in FIG. 5. Die steel was used as the material of a disk 13 as the counterpart, which was slid in contact with a test piece at a rate of 1 to 10 m/sec. In FIG. 5, reference numeral 12 represents a pin.

The rate of wear was measured to be $2.3 \times 10^{-8} mm^2/kg$ for the $Si_3N_4$ sintered body before plastic working and $5.4 \times 10^{-9} mm^2/kg$ for the plastic worked product. Thus, it was found out that the wear resistance of the plastic worked product was improved.

According to the present invention, a silicon nitride ceramic sliding member high in mechanical strength and excellent in reliability can be provided at a low cost without resort to a large amount of grinding or the like for shaping. Additionally stated, the present invention is effective not only for a sliding member but also for metal plastic working members such as a rolling roll, a cutting tool, etc.

What is claimed is:

1. A process for producing a silicon nitride ceramic sliding member with improved mechanical strength, comprising the step (I) of preparing a preform substantially free of free silicon and made of silicon nitride sintered body comprising as main components, at least one member of the group consisting of a $\alpha$-$Si_3N_4$ grains having an average grain size of up to 0.5 $\mu$m and $\beta$-$Si_3N_4$ grains having an average grain size of up to 0.5 $\mu$m in minor axis and a hot plastic working step (II) by placing said preform in a mold and effecting hot plastic deformation of said preform for shaping or dimensional control thereof while simultaneously increasing an average aspect ratio of S$\beta$-columnar crystal grains of the silicon nitride sintered body whereby the proportion of $\beta$-columnar crystal grains of the resultant plastic work product is at least 70% of the $Si_3N_4$ grains.

2. A process for producing a silicon nitride ceramic sliding member as claimed in claim 1, wherein a silicon nitride sintered body as said preform has a relative density of 90 to 98%, and is densified in said step (II).

3. A process for producing a silicon nitride ceramic sliding member as claimed in claim 1, wherein the relative density of a silicon nitride sintered body as said preform is at least 90% and lower than 95%.

4. A process for producing a silicon nitride ceramic sliding member as claimed in claim 1, wherein said average aspect ratio is increased by at least 10% in said step (II).

5. A process for producing a silicon nitride ceramic sliding member as claimed in claim 1, wherein the hot plastic deformation in said step (II) is effected at 800 to 1,800° C.

6. A process for producing a silicon nitride ceramic sliding member as claimed in claim 1, wherein the hot plastic deformation in said step (II) is effected at most 1,600° C.

7. A process for producing a silicon nitride ceramic sliding member as claimed in claim 1, wherein said working in said step (II) is effected in a nonoxidizing atmosphere.

8. A process for producing a silicon nitride ceramic sliding member as claimed in claim 1, wherein said working in said step (II) is effected in air at a temperature of at most 1,200° C.

9. A process for producing a silicon nitride ceramic sliding member as claimed in claim 1, wherein the amount of plastic deformation in said step (II) is 0.1 to 20%.

10. A process for producing a silicon nitride ceramic sliding member as claimed in claim 1, which further comprises the working step (III) of effecting removal working or lapping for securing the dimensional accuracy thereof after said step (II).

11. A process for producing a silicon nitride ceramic sliding member as claimed in claim 10, which further comprises the step (IV) of effecting a heat treatment at a temperature of at most the sintering temperature range of $Si_3N_4$ after effecting the treatment of said steps (II) and (III).

12. A process for producing a silicon nitride ceramic sliding member as claimed in claim 1, which further comprises the step (IV) of effecting a heat treatment at a temperature range of at most the sintering temperature of $Si_3N_4$ after effecting the treatment of said step (II) to improve the mechanical strength of the member.

* * * * *